(12) United States Patent
Oota et al.

(10) Patent No.: US 6,807,433 B2
(45) Date of Patent: Oct. 19, 2004

(54) MOBILE COMMUNICATION TERMINAL WITH UNANSWERED INCOMING-CALL NOTIFYING FUNCTION

(75) Inventors: Hisashi Oota, Hino (JP); Kiyoshi Wagai, Hachioji (JP); Minoru Yamashita, Hachioji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 408 days.

(21) Appl. No.: 10/098,318

(22) Filed: Mar. 18, 2002

(65) Prior Publication Data

US 2003/0176205 A1 Sep. 18, 2003

(51) Int. Cl.[7] .................................................. H04B 1/38
(52) U.S. Cl. ..................... 455/566; 455/412.1; 455/466; 455/550.1; 455/567; 455/569.1; 455/575.1; 340/7.58; 340/7.61; 340/7.59; 379/433.04; 379/373.01; 379/373.02; 379/373.03
(58) Field of Search .............................. 455/412.1, 466, 455/550.1, 567, 569.1, 569.2, 575.1, 575.9, 566; 340/7.58, 7.61, 7.59; 379/433.04, 373.01, 373.02, 373.03

(56) References Cited

U.S. PATENT DOCUMENTS

| | | | | |
|---|---|---|---|---|
| 6,130,646 | A | * 10/2000 | Jang | 343/721 |
| 6,438,392 | B1 | * 8/2002 | Toba | 455/567 |
| 6,529,747 | B1 | * 3/2003 | Toba | 455/563 |
| 6,720,863 | B2 | * 4/2004 | Hull et al. | 340/7.51 |
| 2002/0037754 | A1 | * 3/2002 | Hama et al. | 455/566 |
| 2002/0068615 | A1 | * 6/2002 | Yamada | 455/567 |
| 2003/0083107 | A1 | * 5/2003 | Morishima | 455/566 |

* cited by examiner

*Primary Examiner*—Vivian Chin
*Assistant Examiner*—Minh Dao
(74) *Attorney, Agent, or Firm*—Finnegan, Henderson, Farabow, Garrett & Dunner, L.L.P.

(57) ABSTRACT

A mobile communication terminal is provided with a light-emitting element for notifying an unanswered incoming call. When the cancellation of an incoming call is canceled in a state where an incoming call response operation has not been carried out, the mobile communication terminal is brought into the standby state and then the light-emitting element is caused to emit light.

14 Claims, 6 Drawing Sheets

MOBILE COMMUNICATION TERMINAL WITH UNANSWERED INCOMING-CALL NOTIFYING FUNCTION

BACKGROUND OF THE INVENTION

1. Field of the Invention

This invention relates to a mobile communication terminal, such as a mobile telephone or a PDA (Personal Digital Assistant).

2. Description of the Related Art

When receiving an incoming call signal from a base station, a mobile telephone performs control for establishing a radio communication link with the base station and then carries out an incoming call notifying operation. The incoming call notifying operation is performed by, for example, producing sound, driving a vibrator, or causing a light-emitting diode (LED) to emit light. This incoming call notifying operation enables the user to know the occurrence of an incoming call. In this state, suppose the user performs an incoming call response operation. Then, the mobile telephone carries out an incoming call response operation. Thereafter, the user can talk over the telephone or receive mail.

On the other hand, suppose an incoming call response operation is not carried out because the user is absent. In this case, the mobile telephone detects the abandonment of the outgoing call by the caller, that is, the cancellation of the incoming call. Then, when having detected the abandonment of the incoming call, the mobile telephone stops the incoming call notifying operation and thereafter returns to the standby state.

With such a mobile telephone, however, the user cannot know the fact that an incoming call has occurred, when he or she is absent. To overcome this shortcoming, some mobile telephones are provided with the function of displaying an unanswered incoming call message or an incoming call history on their LCD (Liquid-crystal display). In the case of such a mobile telephone, however, the user cannot know the occurrence of an unanswered incoming call unless he or she intentionally looks at the LCD. This results in a delay in the user noticing the unanswered incoming call.

BRIEF SUMMARY OF THE INVENTION

The object of the present invention is to provide a mobile communication terminal which enables the user to know the occurrence of an unanswered incoming call simply and quickly.

According to an aspect of the present invention, a mobile communication terminal is capable of communicating with another terminal via a network. The terminal comprises, first notifying section for notifying an incoming call to an user of the terminal, first detecting section for detecting incoming call response operation while the incoming call is notified, second detecting section for detecting that the incoming call has been canceled by the network, and second notifying section for notifying an unanswered incoming call by causing a light emitting element to emit light after the second detecting section detects the cancellation of the incoming call before the first detecting section detects the operation that the user performs.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION (First Embodiment)

Figure 1:
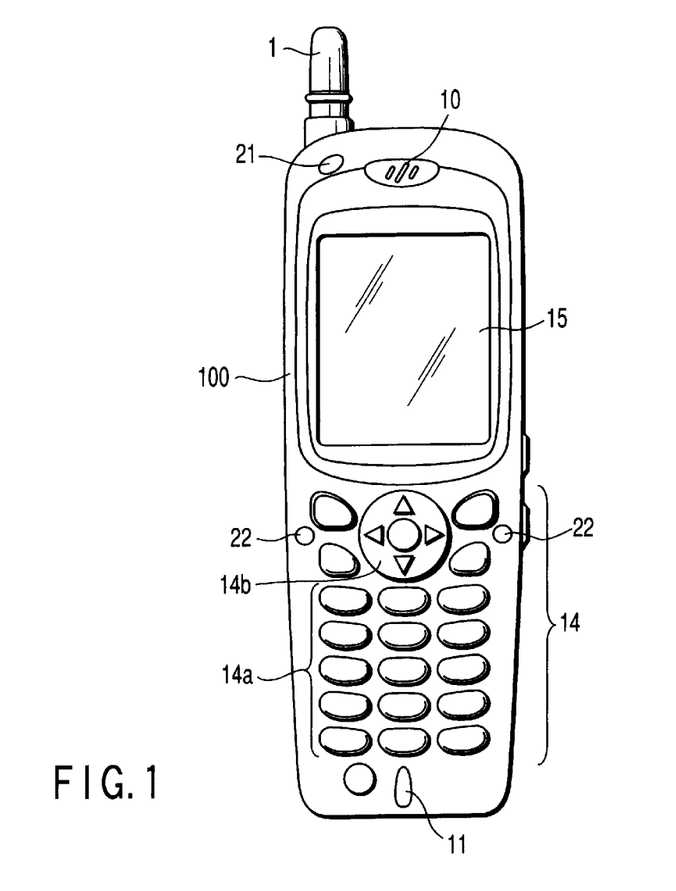
FIG. 1 is a front view of an outward appearance of a mobile communication terminal according to a first embodiment of the present invention.

FIG. 1 is a front view of an outward appearance of a mobile telephone terminal of the fixed shape type according to a first embodiment of the present invention.

On the front panel of a housing 100, there are provided a speaker 10, a liquid-crystal display (LCD) 15, a key input section 14, and a microphone 11. The LCD 15 is used for displaying the telephone number and name of the caller, the information memorized in a telephone directory, information about the operating state of this terminal, and transmitted and received mails. In the key input section 14, there are provided a plurality of function keys, including dial keys 14a, a send key, a power key, an end key, a volume control key, and a multifunction key 14b. At the top of the housing 100, an antenna 1 is installed. The antenna 1 is composed of, for example, a helical antenna.

Furthermore, at the top of the front panel, there is provided a first LED 21. The first LED 21 is used for notifying an incoming call and displaying the battery charging state. On both sides of the multifunction key 14b provided in the middle of the front panel, there are provided second LEDs 22, 22. These second LEDs 22, 22, which are called access sign LEDs, are used for displaying the occurrence of an unanswered incoming call. The number of the access sign LEDs 22, 22 is not necessarily two and may be one. As for installation position, they may be provided in any position, as long as they are positioned conspicuously on the front panel.

Figure 2:
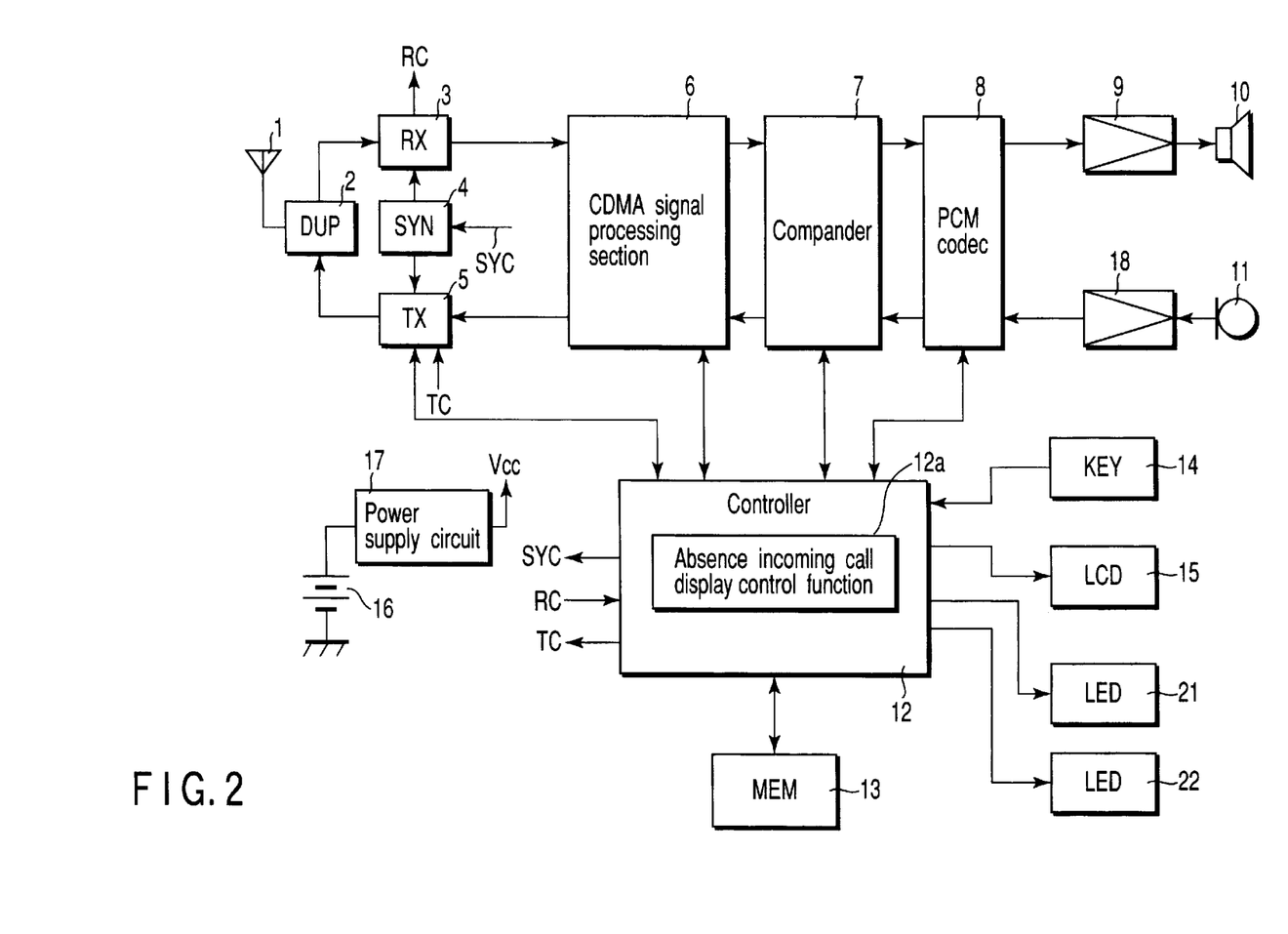
FIG. 2 is a block diagram showing the circuit configuration of the mobile communication terminal according to the first embodiment.

On the other hand, the circuit of the mobile telephone terminal is configured as shown in the block diagram of FIG. 2.

The radio signal transmitted from a base station (not shown) is received by the antenna 1, which then inputs the signal via a duplexer (DUP) to a receiving circuit (RX) 3. In the receiving circuit 3, the radio signal is down-converted into an intermediate frequency signal. The down-converting is done by mixing the radio signal with a local oscillation signal outputted from a frequency synthesizer (SYN) 4. The frequency of the local oscillation signal generated at the frequency synthesizer 4 is determined by a control signal SYC outputted from a controller 12.

The intermediate frequency signal outputted from the receiving circuit 3 is inputted to a CDMA signal processing section 6. The CDMA signal processing section 6 reverse-diffuses the intermediate frequency signal using diffusion codes. Then, the processing section 6 demodulates the reverse-diffused intermediate frequency signal by a modulation scheme corresponding to, for example, the QPSK modulation scheme, thereby converting the intermediate signal into demodulated data according to the data rate. The demodulated data is inputted to a compressing/expanding section (or a compressor/expander) (hereinafter, referred to as a compander) 7.

The compander 7 subjects the demodulated data outputted from the CDMA signal processing section 6 to an expanding process according to the data rate notified by the controller 12. Then, the compander 7 subjects the expanded demodulated data to an error correction demodulating process using, for example, the Viterbi decoding scheme, thereby reproducing the speech data received in the baseband or the received packet data. Then, the compander 7 outputs the received speech data to a PCM coding/decoding section (or a PCM coder/decoder) (hereinafter, referred to as a PCM codec) 8 and the received packet data, such as e-mail, to the controller 12.

The PCM codec 8 PCM-decodes the received speech data and outputs an analog speech signal. The analog speech signal is amplified by a receiver amplifier 9. The amplified signal is then outputted in sound from the speaker 10.

The controller 12 depackets the received packet data, such as e-mail and stores the resulting data in the received data storage area in the memory (MEM) 13. When the user performs the display operation of the received data at the input section 14, the controller 12 reads the received data from the memory 13 according to the operation and displays the data on the display section 15. The controller 12 also has the function of outputting the received data via an external interface (not shown) to a personal computer, when the personal computer is connected to the mobile communication terminal.

On the other hand, the user's speech signal inputted to the microphone 11 in the speech mode is amplified to a suitable level at the receiver amplifier 18. Then, the amplified signal is PCM-coded at the PCM codec 8, which produces transmitting speech data. The transmitting speech data is inputted the compander 7. The packet data, such as e-mail, created in the data communication mode at the controller 12 is inputted from the controller 12 to the compander 7.

The compander 7 detects the amount of energy in the inputted speech from the speech data outputted from the PCM codec 8 and, on the basis of the result of the detecting, determines a data rate. Then, the compander 7 compresses the speech data to data in the format corresponding to the data rate, performs an error correction coding process on the compressed data, and then outputs the resulting data to the CDMA signal processing section 6. In contrast, the compander 7 subjects the transmitting packet data outputted from the controller 12 to the error correction coding process and outputs the resulting data to the CDMA signal processing section 6.

The CDMA signal processing section 6 modulates the transmitting data compressed at the compander 7, by the QPSK modulation scheme, for example. Next, the processing section 6 subjects the modulated transmitting data to a spectrum diffusion process using diffusion codes allocated to the transmission channels in a one-to-one correspondence. Then, the section 6 outputs the diffusion-coded signal to a transmitting circuit (TX) 5.

The transmitting circuit 5 combines the diffusion-coded signal with a local oscillation signal generated at a frequency synthesizer 4, thereby upconverting the diffusion-coded signal into a transmitting radio signal. Then, on the basis of the transmission data rate notified by the controller 12, the transmitting circuit 5 high-frequency amplifies only the effective part of the transmitting radio signal and outputs the amplified signal. The transmitting radio signal outputted from the transmitting circuit 5 is supplied via the duplexer 2 to the antenna 1. The antenna 1 transmits the radio signal to the base station to which the mobile telephone is to be connected.

Here, numeral 17 indicates a power supply circuit, which generates a specific operating power supply voltage Vcc from the output of a battery 16 and supplies the voltage Vcc to each circuit section.

The controller 12 includes a microcomputer and has an unanswered incoming call display control function 12a as a new function. The unanswered incoming call display control function 12a detects the incoming call response operation by the user and the cancellation of the incoming call during the time when the incoming call notifying operation is being carried out. When the incoming call is canceled before the incoming call response operation is carried out, the controller 12 recognizes the incoming call as an unanswered incoming call and then blinks access sign LEDs 22, 22 during a subsequent standby period. While the access sign LEDs 22, 22 are blinking, the controller 12 detects the acknowledge operation by the user. When having detected the user's acknowledge operation, the controller 12 stops the access sign LEDs 22, 22 from blinking.

Figure 3:
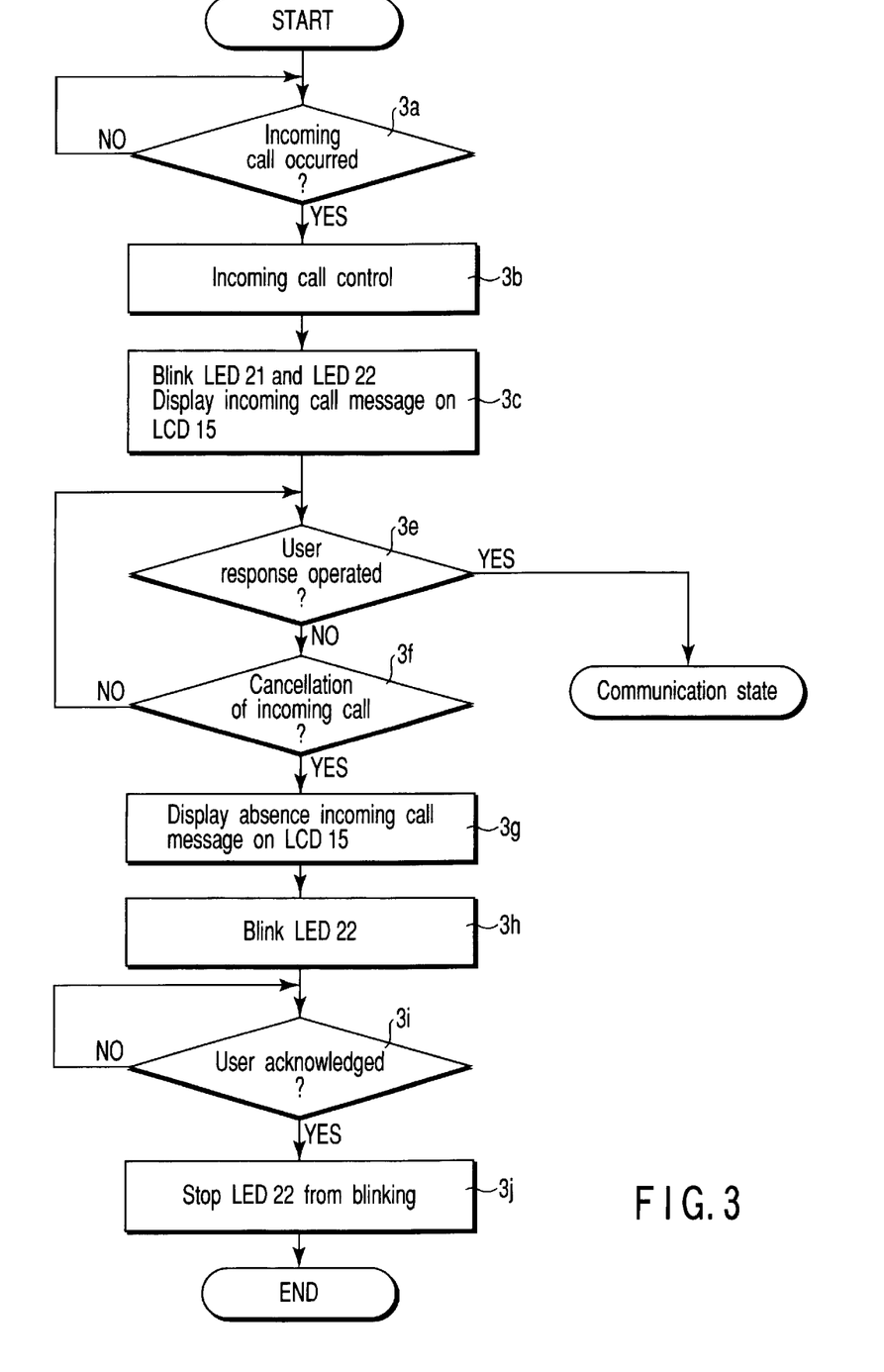
FIG. 3 is a flowchart to help explain the procedure for unanswered incoming call display control performed at the controller shown in FIG. 2.

Next, the unanswered incoming call display operation of the mobile telephone terminal configured as described above will be explained. FIG. 3 is a flowchart to help explain the procedure for the unanswered incoming call display operation.

The controller 12 is detecting the arrival of an incoming call in step 3a. In this state, suppose an incoming call signal or mail has arrived from a base station and the incoming call signal includes an incoming call message addressed to the present terminal. Then, in step 3b, the controller 12 executes a negotiation with the base station for forming a radio link according to a predetermined procedure. At the same time, the controller 12 causes the first LED 21 to blink in step 3c. At this time, in parallel with the light-emitting operation of the first LED 21, the occurrence of an incoming call may be notified by causing the speaker 10 to produce sound or play a melody or making a vibrator (not shown) vibrate. Moreover, in step 3c, the controller 12 creates an incoming call message and displays the created incoming call message on the LCD 15. The incoming call message includes the telephone number, name, and others of the caller. The controller 12 also causes the access sign LEDs 22 to blink in step 3*c*.

In this way, the occurrence of the incoming call is notified to the user. In notifying the incoming call, the access sign LEDs 22 are not necessarily caused to emit light.

In the incoming call notifying period, the controller 12 detects the cancellation of the incoming call in step 3*f*, while detecting the incoming call response operation by the user in step 3*e*. If the incoming call is canceled before the incoming call response operation is carried out by the user, the controller 12 recognizes the incoming call as an unanswered incoming call and creates an unanswered incoming call message in step 3*g*. Then, the controller 12 displays the created unanswered incoming call message on the LCD 15. The unanswered incoming call message includes the telephone number, name, and others of the caller.

At the same time, the controller 12 causes the access sign LEDs 22 to blink in step 3*h*. This enables the user to know the occurrence of an incoming call easily from the blinking of the access sign LEDs 22 even when being away from the mobile telephone terminal.

Figure 4A:
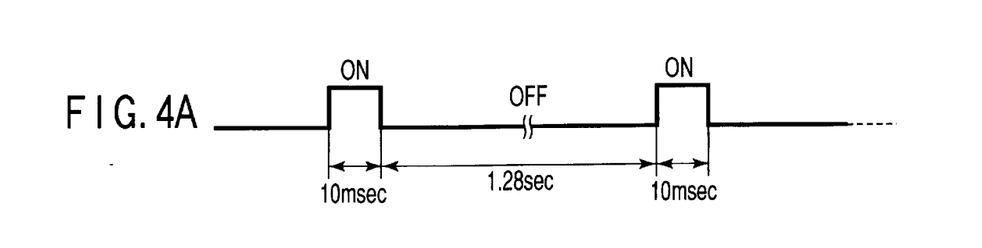
FIGS. 4A and 4B are timing charts to help explain the light-emitting patterns for the LEDs which emit light by unanswered incoming call display control shown in FIG. 3.
Figure 4B:
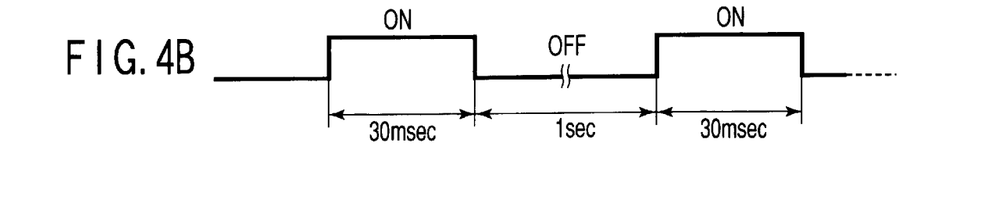

The light-emitting patterns of the access sign LEDs 22 are controlled by the controller 12 in such a manner that they change according to the type of incoming call. For example, when an incoming call requesting a speech has occurred, the controller 12 causes the access sign LEDs 22 to blink repeatedly in such a manner that it turns them on for 10 milliseconds and then turns them off for 1.28 seconds as shown in FIG. 4A. In contrast, when an incoming call requesting the reception of e-mail has occurred, the controller 12 causes the access sign LEDs 22 to blink repeatedly in such a manner that it turns them on for 30 milliseconds and turns them off for 1 second. As a result, from the blinking patterns of the access sign LEDs 22, the user can determine whether the unanswered incoming call requests a voice speech or the reception of e-mail.

The light-emitting patterns of the access sign LEDs 22 are not limited to blinking and may be continuous lighting. In the case of continuous lighting, emitting light of different colors according to the type of incoming call enables a plurality of types of incoming calls to be displayed distinguishably.

Because an unanswered incoming call message is displayed on the LCD 15, the user can know the occurrence of an incoming call from the access sign LEDs 22 and then look at the unanswered incoming call message on the LCD 15 to check the telephone number, name, and others of the caller.

While the access sign LEDs 22 are emitting light, the controller 12 detects the acknowledgment of the unanswered incoming call by the user in step 3*i*. In this state, when the user acknowledges the unanswered incoming call by pressing a specific key, the controller 12 stops the access sign LEDs 22 from blinking in step 3*j*.

As described above, with the mobile telephone terminal of the first embodiment, when an unanswered incoming call has been detected, the access sign LEDs 22 provided on both sides of the middle part of the front panel, that is, in the most conspicuous position are caused to blink. This makes it possible to let the user know the occurrence of an unanswered incoming call clearly. Moreover, use of different light-emitting patterns of the access sign LEDs 22 according to the type of incoming call enables a plurality of types of incoming calls to be displayed distinguishably. In addition, by keeping the access sign LEDs 22 emitting light until the user acknowledges the unanswered incoming call, it is possible to let the user know the occurrence of the unanswered incoming call reliably. As a result, the user can know visually the occurrence of the unanswered incoming call easily and clearly, even when being away from the mobile telephone terminal or in a dark place.

Furthermore, the access sign LEDs 22, which are provided separately from the LED 21 for indicating an incoming call and the battery charging state, display the occurrence of an unanswered incoming call. This enables the user to know visually the occurrence of an unanswered incoming call from the blinking of the access sign LEDs 22, even when the battery is being charged, or when a new incoming call has occurred.

(Second Embodiment)

Figure 5:
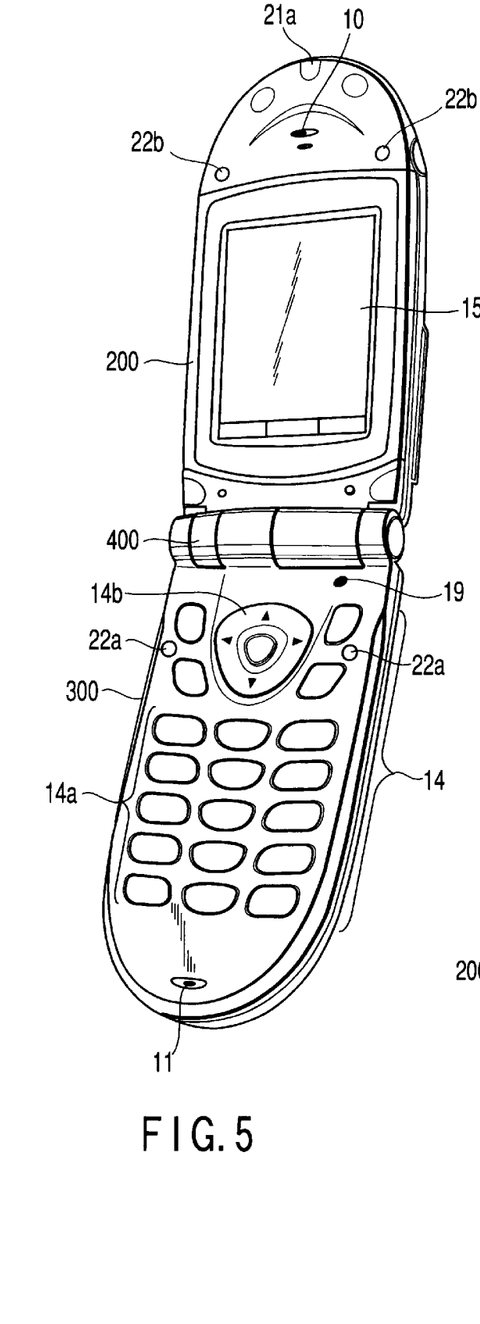
FIG. 5 is a front view of an outward appearance of a mobile communication terminal according to a second embodiment of the present invention.
Figure 6:
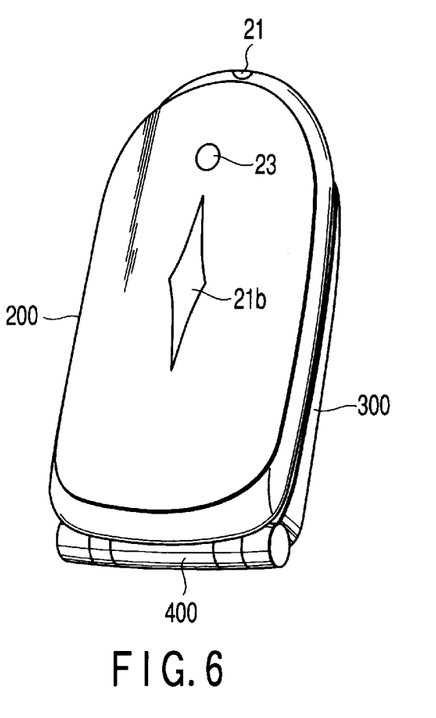
FIG. 6 is a back view of the outward appearance of the mobile communication terminal according to the second embodiment.

FIGS. 5 and 6 show an outward appearance of a folding mobile telephone terminal, which is a mobile communication terminal according to a second embodiment of the present invention. FIG. 5 is a front view of the folding mobile telephone terminal, with its housings open. FIG. 6 is a back view of the telephone terminal, with its housings closed. In these figures, the same functional parts as those in FIG. 1 are indicated by the same reference numerals.

This mobile telephone terminal is a folding terminal where an upper housing 200 and a lower housing 300 are connected by a hinge 400 in such a manner that they can rotate. On the front panel of the upper housing 200, there are provided an LED 21*a* for notifying an incoming call and displaying the battery charging state, a speaker 10, and an LCD 15. On the back panel of the upper housing 200, too, an LED 21*b* is provided to notify an incoming call and the battery charting state. On the other hand, on the front panel of the lower housing 300, there are provided a key input section 14 and a microphone 11. The key input section 14 is composed of a plurality of function keys, including dial keys 14*a*, a send key, a power key, an end key, a volume control key, and a multifunction key 14*b*. An open/close sensor 19 is provided near the hinge section 400 of the front panel of the lower housing 300. The open/close sensor 19 is used for detecting the opening/closing state of the upper housing 200 and lower housing 300.

An antenna is built in the upper housing 200 or lower housing 300.

On both sides of the multifunction key 14*b* provided in the middle of the front panel of the lower housing 300, access sign LEDs 22*a* are provided, one for one side. Other access sign LEDs 22*b* are provided on the front panel of the upper housing 200. The access sign LEDs 22*a*, 22*b* are used for displaying the occurrence of an unanswered incoming call. The number of the first access sign LEDs 22*a*, 22*b* is not necessarily two and may be one. The positions in which they are installed are not limited to the lower housing 300 or upper housing 200. They may be installed in any positions, provided that they are located in conspicuous positions on the front panel.

Moreover, on the back of the upper housing 200, a second access sign LED 23 is provided. The second access sign LED 23 is also used for displaying the occurrence of an unanswered incoming call as are the first access sign LEDs 22*a*, 22*b*.

Figure 7:
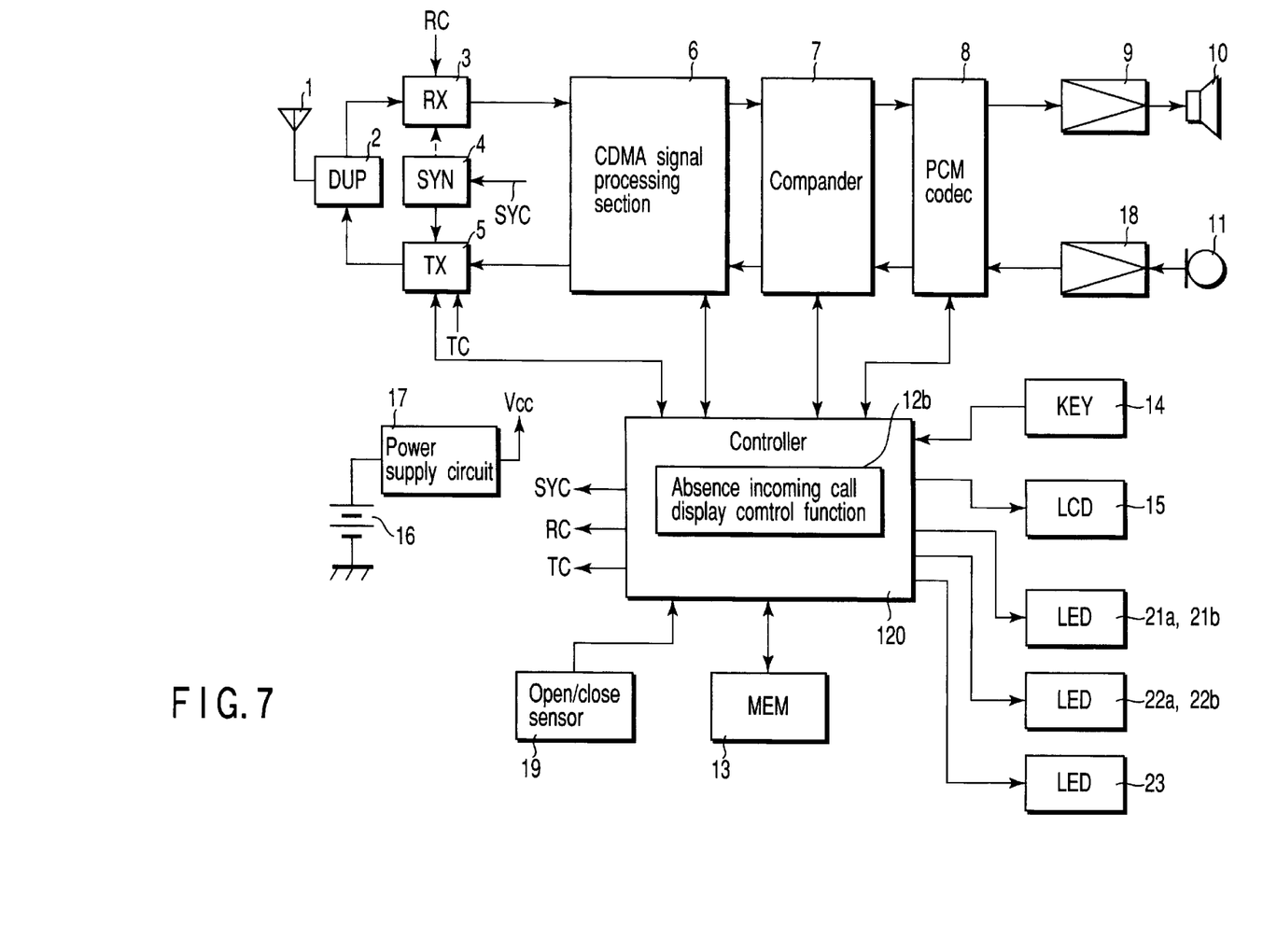
FIG. 7 is a block diagram showing the circuit configuration of the mobile communication terminal according to the second embodiment.

FIG. 7 is a block diagram showing a circuit configuration of the mobile telephone terminal. The detect signal from the open/close sensor 19 is inputted to the controller 120. The first and second access sign LEDs 22*a*, 22*b*, 23 are connected to the controller 120.

The controller 120 has an unanswered incoming call display control function 12b. The unanswered incoming call display control function 12b detects the incoming call response operation by the user and the cancellation of the incoming call, while the incoming call notifying operation is being carried out. If the incoming call is canceled before the incoming call response operation is carried out, the control function 12b recognizes the incoming call as an unanswered incoming call and selectively blinks the first access sign LEDs 22a, 22b and second access sign LED 23 during a subsequent standby period. At this time, whether the first access sign LEDs 22a, 22b or the second access sign LED 23 is caused to emit light is determined on the basis of the detect signal from the open/close sensor 19.

Furthermore, the unanswered incoming call display control function 12b detects the acknowledge operation by the user while the first access sign LEDs 22a, 22b or second access sign LED 23 is blinking. Then, when the user's acknowledge operation has been detected, the function 12b stops the access sign LEDs 22a, 22b or access sign LED 23 from blinking.

Figure 8:
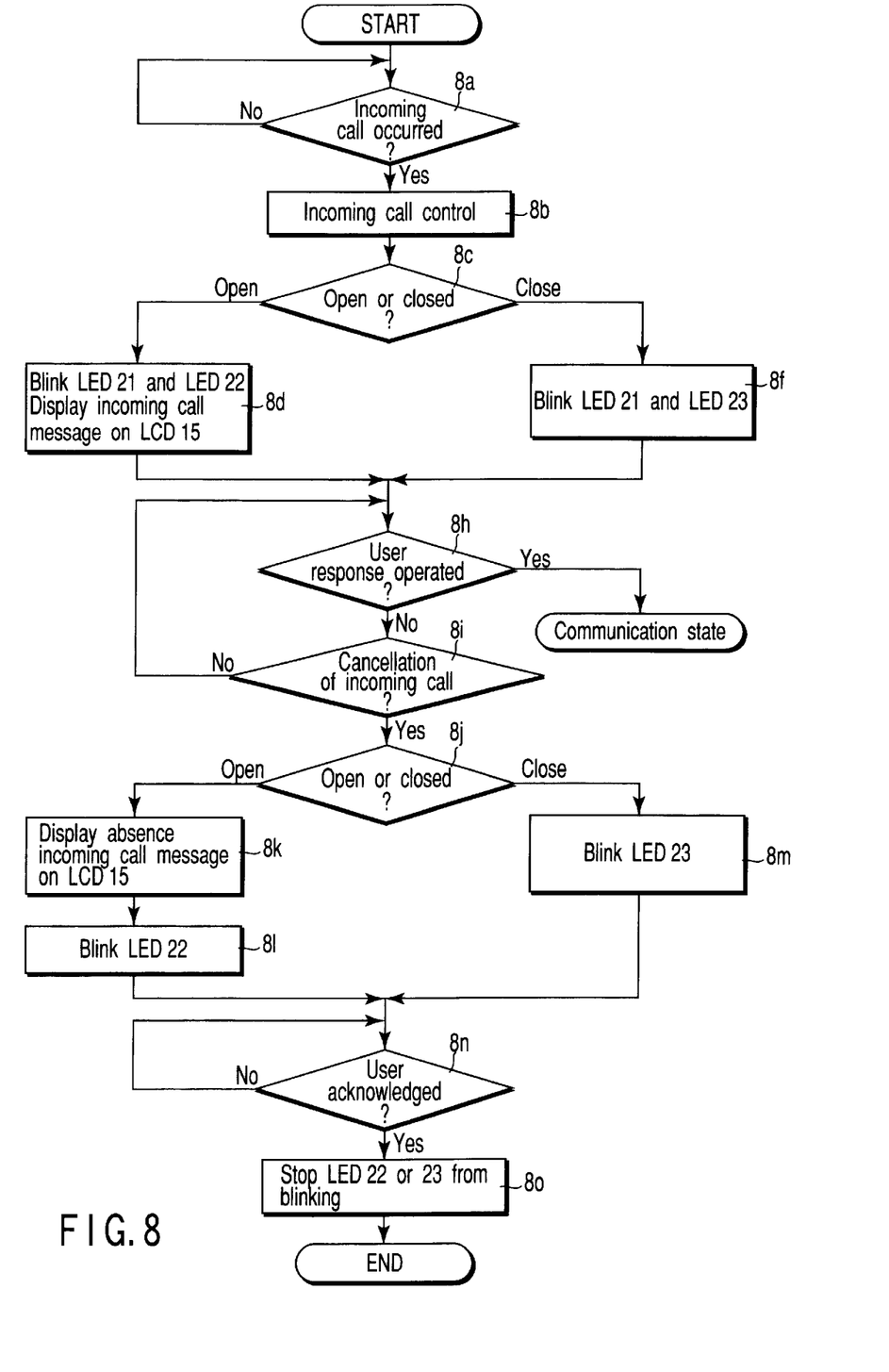
FIG. 8 is a flowchart to help explain the procedure for unanswered incoming call display control performed at the controller shown in FIG. 7.

Next, an absence incoming display operation by the mobile telephone terminal configured as described above will be explained. FIG. 8 is a flowchart to help explain the procedure for the unanswered incoming call display operation.

The controller 120 detects the arrival of an incoming call in step 8a. In this state, suppose an incoming call signal or mail has arrived from a base station and the incoming call signal includes an incoming call message addressed to the present terminal. Then, the controller 120 executes a negotiation with the base station to form a radio link according to a predetermined procedure in step 8b.

At the same time, the controller 120 takes in the detect signal from the open/close sensor 19 in step 8c and, on the basis of the detect signal, determines whether the upper housing 200 and lower housing are in the open or closed state. Then, if the upper housing 200 and lower housing 300 are in the open state, the controller 120 causes the incoming call notifying LED 21a, 21b to blink in step 8d. At this time, in parallel with the light-emitting operation of the LED 21a, 21b, the occurrence of an incoming call may be notified by causing the speaker 10 to produce sound or play a melody or making a vibrator (not shown) vibrate. Moreover, in step 8d, the controller 120 creates an incoming call message and displays the created incoming call message on the LCD 15. The incoming call message includes the telephone number, name, and others of the caller. The controller 120 also causes the access sign LEDs 22a, 22b to blink in step 8d.

On the other hand, in step 8c, if the upper housing 200 and the lower housing 300 are in the closed state, the controller 120 blinks not only the incoming call notifying LED 21a, 21b in step 8f but also the second access sign LED 23 in step 8f.

In this way, even when the upper housing 200 and lower housing 300 are in the open state, or in the closed state, the occurrence of the incoming call is notified to the user. In notifying the incoming call, the first access sign LEDs 22a, 22b or the second access sign LED 23 are not necessarily caused to emit light.

In the incoming call notifying period, the controller 120 detects the cancellation of the incoming call in step 8i, while detecting the incoming call response operation by the user in step 8h. If the incoming call is canceled before the incoming call response operation is carried out by the user, the controller 120 recognizes the incoming call as an unanswered incoming call. In the case of an unanswered incoming call, the controller 120 takes in the detect signal from the open/close sensor 19 in step 8j and, on the basis of the detect signal, determines whether the upper housing 200 and lower housing 300 are in the open state or in the closed state. If the upper housing 200 and lower housing 300 are in the open state, the controller 120 creates an unanswered incoming call message in step 8k. Then, the controller 120 displays the created unanswered incoming call message on the LCD 15. The unanswered incoming call message includes the telephone number, name, and others of the caller. At the same time, the controller 120 selects the first access sign LEDs 22a, 22b in step 81 and causes the first access sign LEDs 22a, 22b to blink.

In contrast, in step 8j, if it has been determined that the upper housing 200 and lower housing 300 are in the closed state, the controller 120 causes the second access sign LED 23 to blink in step 8m.

Therefore, even when the upper housing 200 and lower housing 300 are in the open state or in the closed state, the first access sign LEDs 22a, 22b or second access sign LED 23 informs the user of the occurrence of an unanswered incoming call. This enables the user to know the occurrence of an unanswered incoming call easily from the blinking of the first access sign LEDs 22a, 22b or second access sign LED 23, even when being away from the mobile telephone terminal.

At this time, the light emitting patterns of the first access sign LEDs 22a, 22b and second access sign LED 23 are controlled by the controller 120 in such a manner that they change according to the type of incoming call. As a result, from the blinking patterns of the first access sign LEDs 22a, 22b and second access sign LED 23, the user can determine whether the unanswered incoming call requests a speech or the reception of e-mail.

The light-emitting patterns of the first access sign LEDs 22a, 22b and second access sign LED 23 are not limited to blinking and may be continuous lighting. In the case of continuous lighting, emitting light of different colors according to the type of incoming call enables a plurality of types of incoming calls to be displayed distinguishably.

During the period that the first access sign LEDs 22a, 22b or second access sign LED 23 is emitting light, the controller 120 detects the acknowledge operation of an incoming call by the user in step 8n. In this state, when the user acknowledges the incoming call by pressing a specific key, the controller 120 stops the first access sign LEDs 22a, 22b or second access sign LED 23 from blinking.

As described above, in the mobile telephone terminal of the second embodiment, the open/close state of the upper housing 200 and lower housing 300 is detected and, on the basis of the result of the detecting, either the first access sign LEDs 22a, 22b or the second access sign LED 23 is selected and caused to blink. Thus, even when the upper housing 200 and lower housing 300 are in the open state or in the closed state, the blinking of the first access sign LEDs 22a, 22b or second access sign LED 23 enables the user to know the occurrence of an unanswered incoming call visually. Moreover, changing the light-emitting patterns of the first access sign LEDs 22a, 22b or second access sign LED 23 according to the type of incoming call makes it possible to display a plurality of types of incoming calls distinguishably. Furthermore, by keeping the first access sign LEDs 22a, 22b or second access sign LED 23 emitting light until the user acknowledges the unanswered incoming call, it is possible to let the user know the occurrence of the unanswered incoming call reliably. As a result, the user can know visually the occurrence of the unanswered incoming call easily and clearly, even when being away from the mobile telephone terminal or in a dark place.

(Other Embodiments)

In the first and second embodiments, it has been determined whether an unanswered incoming call is either an incoming call requesting a speech or an incoming call requesting the reception of e-mail and, on the basis of the determination, the blinking pattern has been changed. The present invention is not limited to this. For instance, it may be determined whether the caller of the unanswered incoming call uses another mobile telephone terminal subscribing to the same communication carrier as that of the present terminal or a terminal subscribing to another communication carrier and, on the basis of the result of the determination, the blinking pattern may be changed.

In the case of an absence mail incoming call, it may be determined whether a mail incoming call has arrived via the Internet or is the one unique to the communication carrier and, on the basis of the result of the determination, the blinking pattern may be changed.

It is, of course, possible to change the colors of light emitted from the access sign LEDs instead of changing the blinking patterns of the access sign LEDs.

Furthermore, as for the number of access sign LEDs, their installation places, the types of light-emitting elements, the type, shape, and configuration of mobile communication terminals, the radio communication scheme, and the procedure for and the contents of unanswered incoming call control, the present invention may be practiced or embodied in still other ways without departing from the spirit or essential character thereof.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mobile communication terminal capable of communicating with another terminal via a network, comprising:
   first notifying means for notifying an incoming call to an user of the terminal, upon receiving the incoming call addressed to the terminal;
   first detecting means for detecting incoming call response operation while the incoming call is notified;
   second detecting means for detecting that the incoming call has been canceled by the network; and
   second notifying means includes at least one light-emitting element, for notifying an unanswered incoming call by causing the light-emitting element to emit light, after said second detecting means detects the cancellation of the incoming call before said first detecting means detects the incoming call response operation.

2. The mobile communication terminal according to claim 1, wherein said light-emitting element is separated from other light-emitting element used for notifying the incoming call or displaying a battery charging state.

3. The mobile communication terminal according to claim 1, wherein said second notifying means causes said light-emitting element to emit light continuously.

4. The mobile communication terminal according to claim 1, wherein said second notifying means causes said light-emitting element to emit light intermittently.

5. The mobile communication terminal according to claim 1, wherein said second notifying means further includes means for monitoring the user's acknowledgment operation while said second notifying means is notifying a predetermined information, upon detecting the user's acknowledgment operation, and causes said second notifying means to stop notifying the unanswered incoming call.

6. The mobile communication terminal according to claim 1, wherein said second notifying means determines whether the incoming call is a first incoming call which requests speech or the incoming call is a second incoming call which requests the reception of electronic mail, and notifies the first incoming call in a specific pattern and the unanswered incoming call in a different pattern.

7. The mobile communication terminal according to claim 6, wherein said second notifying means causes said light-emitting element different to blink for a first period to notify the first incoming call and to blink for a second period to notify the second incoming call.

8. The mobile communication terminal according to claim 6, wherein said second notifying means causes said light-emitting element to emit light of a first color to notify the first incoming call and to emit light of a second color to notify the second incoming call.

9. The mobile communication terminal according to claim 1, wherein said second notifying means determines whether the incoming call is a third incoming call from a first another terminal subscribing to a carrier to which said mobile communication terminal has subscribed, or a fourth incoming call from a second another terminal subscribing to another carrier, and notifies the unanswered incoming call in a specific pattern when the third incoming call is received and in a different pattern when the fourth incoming call is received.

10. The mobile communication terminal according to claim 9, wherein said second notifying means causes said light-emitting element different to blink for a specific period to notify the third incoming call and to blink for a different period to notify the fourth incoming call.

11. The mobile communication terminal according to claim 9, wherein said second notifying means causes said light-emitting element to emit light in a specific color to notify the third incoming call and to emit light in a different color to notify the fourth incoming call.

12. The mobile communication terminal according to claim 1, wherein said second notifying means further includes means for displaying information indicating the contents of the unanswered incoming call.

13. A mobile communication terminal having a first housing and a second housing rotatably connected to the first housing, said mobile communication terminal comprising:
   notifying means for notifying an incoming call to an user of the terminal from a network, upon receiving the incoming call addressed to the terminal;
   first detecting means for detecting incoming call response operation while the incoming call is notified;
   second detecting means for detecting that the incoming call has been canceled by the network;
   a first light-emitting element located to be invisible from outside while the first and second housings remain closed;
   a second light-emitting element located to be visible from outside even while the first and second housings remain closed; and control means for causing said first and second light-emitting elements to emit light after said second detecting means detects the cancellation of the incoming call before said first detecting means detects the operation that the user performs.

14. The mobile communication terminal according to claim 13, further comprising open/close determination means for determining whether the first and second housings remain closed, wherein said control means selects said first light-emitting element when the said open/closed determination means determines that the first and second housings remain opened, and selects said second light-emitting element when the said open/closed determination means determines that the first and second housings remain closed.

* * * * *